July 10, 1934.  W. H. PETIT ET AL  1,966,261
PHOTOGRAPHIC MECHANISM AND FILM MAGAZINE USED THEREWITH Original Filed Jan. 25, 1933     6 Sheets-Sheet 1

Inventors:
William H. Petit,
Edson S. Hineline,
by Emery, Booth, Varney and Townsend
Attys

July 10, 1934. W. H. PETIT ET AL 1,966,261
PHOTOGRAPHIC MECHANISM AND FILM MAGAZINE USED THEREWITH
Original Filed Jan. 25, 1933 6 Sheets-Sheet 3

Inventors:
William H. Petit,
Edson S. Hineline,

July 10, 1934.  W. H. PETIT ET AL  1,966,261
PHOTOGRAPHIC MECHANISM AND FILM MAGAZINE USED THEREWITH
Original Filed Jan. 25, 1933  6 Sheets-Sheet 4

Inventors:
William H. Petit,
Edson S. Hineline,
By Emery, Booth, Varney and Townsend
Attys Patented July 10, 1934

1,966,261

UNITED STATES PATENT OFFICE 1,966,261

PHOTOGRAPHIC MECHANISM AND FILM MAGAZINE USED THEREWITH

William H. Petit, Dayton, Ohio, and Edson S. Hineline, Rochester, N. Y., assignors to Folmer Graflex Corporation, Rochester, N. Y., a corporation of Delaware Original application January 25, 1933, Serial No. 653,426. Divided and this application March 12, 1934, Serial No. 715,106

6 Claims. (Cl. 95—15)

This application is a division of our co-pending application Ser. No. 653,426, filed January 25, 1933, wherein is disclosed and claimed photographic apparatus of the present type in combination with mechanism for manipulating the same in certain relation to an object-surface. In a co-pending application of Edson S. Hineline, one of the joint inventors herein, Ser. No. 669,508, filed May 5, 1933, is disclosed and claimed per se a film package or magazine of the general type herein disclosed, for use in association with a photograpic apparatus.

This invention relates to photographic cameras or mechanisms and to photographic film magazines adapted to contain film supporting, feeding and take-up means sealed against tampering, the magazine itself being sealed in operative relation upon or to the camera so as to prevent tampering therewith by unauthorized individuals.

In order that the principle of the invention may be readily understood, we have disclosed in the accompanying drawings a single embodiment of means illustrative of our invention. While our invention is in no wise limited thereto, we have chosen to represent the camera with its magazine as employed to photograph the readings of a voting machine.

A principal purpose of our invention is to photograph a relatively large sheet or surface distinctly and of such a size or scale that the figures or lettering or other indications upon the sheet or surface may be easily read without enlargement, while at the same time making the photographic exposure at a very short distance from the surface or sheet. This is highly desirable because it is frequently impossible, owing to the crowded condition of a room or the small size thereof, to place the photographic apparatus at any great distance from the object or surface to be photographed.

In that embodiment of our invention herein disclosed (namely, the photographing of the recording face of the voting machine), it is evident that these are generally used in places where it would be extremely difficult, if not impossible, to position the photographic apparatus at a substantial distance from the voting machine. Moreover, if this could be done, the picture would be upon such a small scale that it would be necessary to make enlargements thereof for practical use.

In practising our invention, we employ a bank or series of lenses and cause the same to traverse across the surface to be photographed. Each lens thus is functioning with respect to a single narrow transverse zone of the entire surface. The entire set or bank of lenses together photograph by their respective zones the entire surface or sheet and together produce by a single exposure a picture of the entire sheet or surface.

We will specifically describe that single embodiment of our invention, but without thereby limiting the invention to the single use illustrated.

Figure 1:
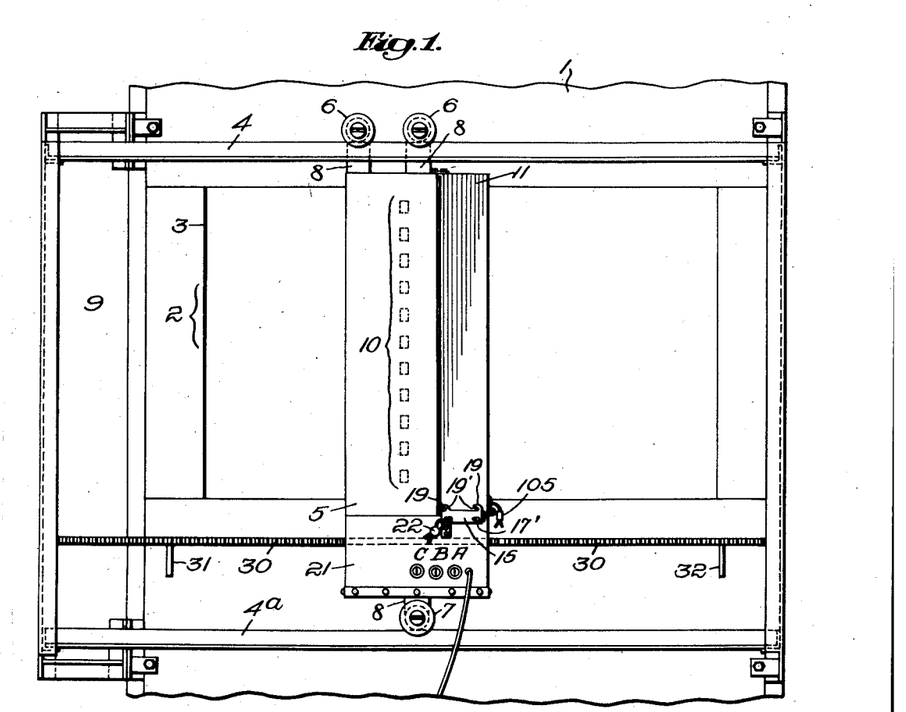
Fig. 1 is an elevation of a part of the back of a voting machine having the photographic mechanism of our invention applied thereto.

Referring first to Fig. 1, the back of the voting machine is indicated at 1. Upon the back are a series of readings generally indicated at 2 in Fig. 1. The readings consist of numerals upon the peripheries of sets of disks, each set of disks indicating the total number of votes for one person or matter.

Upon the back of the voting machine, we position an upper and a lower track 4, 4a, and the photographic apparatus which is indicated generally at 5 in the several figures is provided with two upper rolls 6, 6 and a lower roll 7, all suitably carried by brackets or members 8, 8, 8, shown most clearly in Fig. 1.

The voting machine should be provided with a lateral extension 9 in front of which the tracks 4, 5 extend, the purpose being to afford means to support the photographic apparatus at one side of the voting machine and thus to leave all the back of the said machine open to inspection.

The photographic apparatus itself may be of various shapes and sizes according to the size or shape of the sheet or surface that is to be photographed. We have herein represented the same as of a general upright oblong shape, the height or length thereof being somewhat in excess of the height of that part of the back of the voting machine having all the readings of the voting.

Referring to Fig. 1, it will be observed that there are eleven sets of readings in each vertical tier. We accordingly provide eleven lenses, indicated at 10 in the several figures, each lens being so positioned as to take care of all the readings which are at the same level entirely across the back of the voting machine. Thus, with eleven sets of readings in each vertical tier, there are provided eleven lenses 10. This number will, of course, be varied or changed to suit other conditions or other sheets or surfaces to be photographed. So far as we are aware, we are the first to photograph at very close quarters a relatively large surface by employing a series of lenses, all for making a single picture. In the disclosed embodiment of the invention, the photographic apparatus is in motion across the back of the voting machine while the exposure is being made and, so far as we are aware, we are the first to provide a series of lenses cooperating in the photographing of a surface by a single exposure while using a series of lenses.

While the shape and size of the photographic apparatus are determined by the particular requirements of the case, it is an important feature of our invention to provide a magazine which may be sealed against tampering, said magazine containing the sensitized surface or film and suitable supporting means therefor. Such magazine may be removed in its sealed condition from the camera or photographic apparatus, and transmitted to the place where the sensitive surface or film is to be developed.

Figure 5:
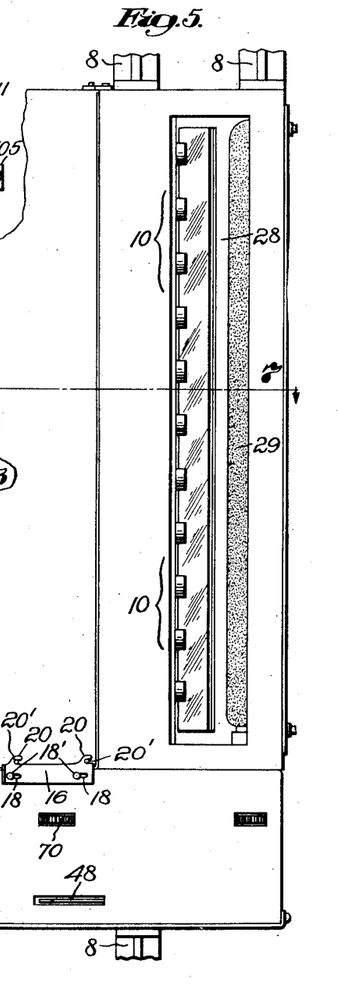
Fig. 5 is a front elevation of the structure shown in Fig. 3.

While the magazine or sealed receptacle may be variously constructed, we have in several figures indicated the same generally at 11. Viewing Fig. 3, which is a side elevation, Fig. 6, which is a plan, and the other views showing the magazine or sealed receptacle, it will be evident that the top of the body portion 5 of the photographic apparatus is provided with a hook 12 and the bottom is provided with a hook 13 for engagement with pins 14. Also, as evident from Figs. 3 and 5, there are provided near the lower end of the magazine two opposite slides 15, 16, having slots 17, 18 receiving pins 17', 18' permitting the said slides to be moved to engage or disengage by their ears 19, 20 the pins 19', 20' which are on the side and back of the magazine. The slides 15, 16 are themselves supported by the pins 17', 18' and their slots, upon the lower or base portion 21 of the photographic apparatus, and seals are provided one of which is indicated at 22, to secure the slides in position thus locking the magazine to the camera or body portion 5 thereof. In order to remove the magazine it is necessary to destroy or break the seals 22 for the two slides 15, 16 so as thereby to release the slides 15, 16, and this is done only by authorized persons.

We do not in this application claim the sealed package containing the photographic elements or parts shown because the same is claimed in a separate application, Ser. No. 669,508. The sealed package is, however, claimed herein in combination with means for sealing said package or magazine in operative relation to the camera.

Such sealed package is capable of use in many different relations and the same is shown here only as a part of a photographic organization designed to be used in making records of the readings of a voting machine.

Figure 9:
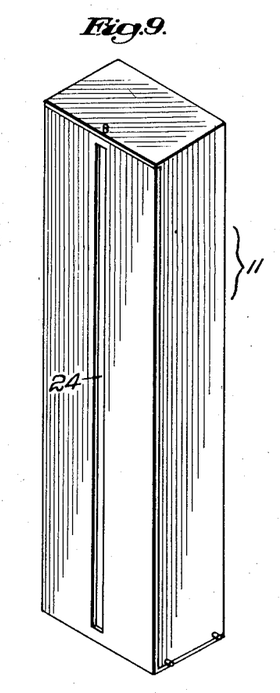
Fig. 9 is a perspective view of the magazine of the photographic apparatus.

The magazine itself is indicated as separated from the body of the photographic apparatus in Fig. 9. It will be observed that in this embodiment of the sealed package there exists an entirely closed receptacle having the described pins by which the magazine is held or secured in position for use. The receptacle is also provided with a lengthwise slit 24, indicated also in section in Fig. 7, and through which and the similar slit 25 the image or picture is transmitted to the film, indicated at 26. In said Fig. 7, one of the lenses is indicated at 10, and in the rear thereof is the inclined mirror 27. The image is transmitted to the mirror 27 through the relatively wide vertical opening 28 in the wall of the camera body 5, the said opening 28 being indicated upon a larger scale in Fig. 5. In the rear of the mirror 27 is positioned the light 29 which is preferably a long bulb of the entire height of the photographic apparatus or at least so much of the height as is comprehended by the entire bank or set of lenses 10.

It is to be understood that in the disclosed embodiment of my invention the picture or exposure is to be made while the camera or photographic apparatus 5 is traveling across the back of the voting machine. This is accomplished by moving the photographic film at the same rate at which the receptacle or apparatus 5 travels, thus providing relatively stationary parts.

So far as the disclosed embodiment or use of our invention is concerned, it is necessary to photograph the voting machine (in this case, the back thereof) before the voting begins and to photograph the same again after the voting is ended. Thus a comparison may be made of the two impressions or pictures and the difference in the readings of the different units or steps in the two pictures would be the total votes.

If no photograph were taken of the voting machine before the voting began, it is evident that fraud could be perpetrated by turning the readings at some of the disks in such a way as to cause a misrepresentation of the total vote of some candidate or candidates. For example, a fraudulent result might be indicated in the following manner.

In the practice or operation of this embodiment of our invention the photographic apparatus 5 will be first positioned at the extreme left side of the back of the voting machine viewing Fig. 1, that is, directly in front of the extension 9 so that all of the counting or indicating disks 2 are exposed to view.

The photographic apparatus 5 is provided with means (preferably an electric motor) by which it is automatically moved across the back of the voting machine, taking the picture of the back of the voting machine during the travel of the photographic apparatus 5, which at the end of its travel toward the right, viewing Fig. 1, will automatically reverse its direction of travel and return to its initial position at the extreme left of Fig. 1, during which reverse travel no picture will be taken, as will be explained. This will, when the film is developed, give a photographic reproduction of the back of the voting machine before the voting begins. At the close of voting this same operation is repeated so that a picture is made of the back of the voting machine at the termination of voting.

In order that the photographic apparatus 5 may not be moved from its position of rest at the extreme left of Fig. 1 until started by authorized persons, such as the supervisors of elections, we have provided the following structure or mechanism as one embodiment only of means for controlling the travel of the photographic apparatus 5.

Figure 3:
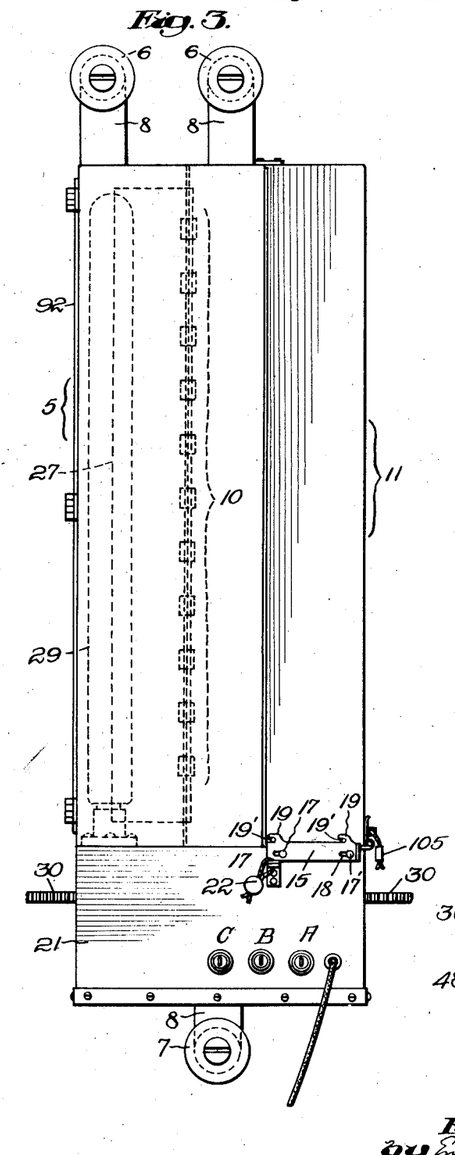
Fig. 3 is a rear elevation of the photographic apparatus including its magazine.

Viewing Figs. 1 and 3, it will be observed that there are three apertures or key holes A, B, C. The keys for these three different apertures must differ among themselves to ensure the utmost safeguarding. They are intended to be in the sole custody of three different election inspectors or officials, of, say, the three leading parties. It is necessary therefore for the three keys to be inserted and turned before the motor can begin to run or function.

Referring to Fig. 1, it will be noted that there is a rack 30 mounted or supported across the back of the voting machine below all the indicating or counting disks 2, and preferably spaced only a few inches therefrom. The said rack 30 is provided with a starting pin 31 and a reversing pin 32.

The film and its let-off and take-up rolls are mounted in the sealed magazine or receptacle 11 which is to be opened only by an authorized person, but the electric motor and its gearing are mounted in the basal portion of the apparatus 5, but so as to feed the film into the sealed magazine 11.

The photographic apparatus is preferably not provided with a shutter and therefore a continuous exposure is made during the entire travel of the photographic apparatus 5 across the back of the voting machine when traveling toward the right viewing Fig. 1.

It is therefore necessary to provide means to feed the film past an exposure opening therefor at precisely the same speed at which the photographic apparatus travels across the back of the voting machine. While this may be accomplished in many different ways, we have for this embodiment of the invention shown the following means.

Figure 6:
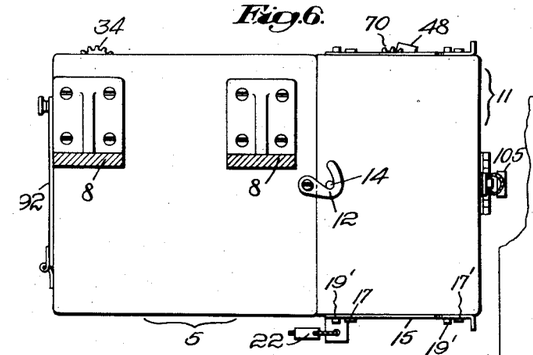
Fig. 6 is a top plan view thereof but with certain of the parts shown in transverse section.
Figure 10:
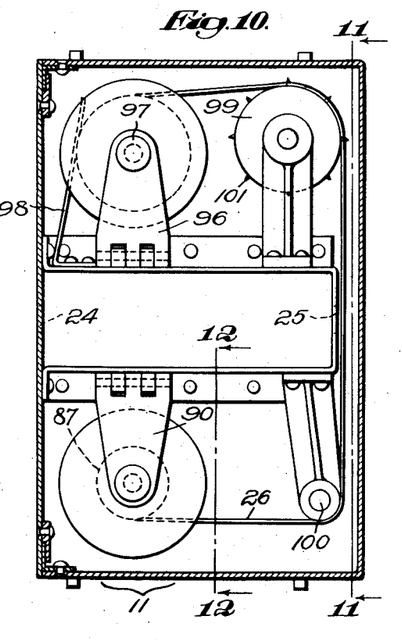
Fig. 10 is a transverse section similar to the right hand side of Fig. 7 but upon a larger scale, the parts within the casing being shown in plan.
Figure 11:
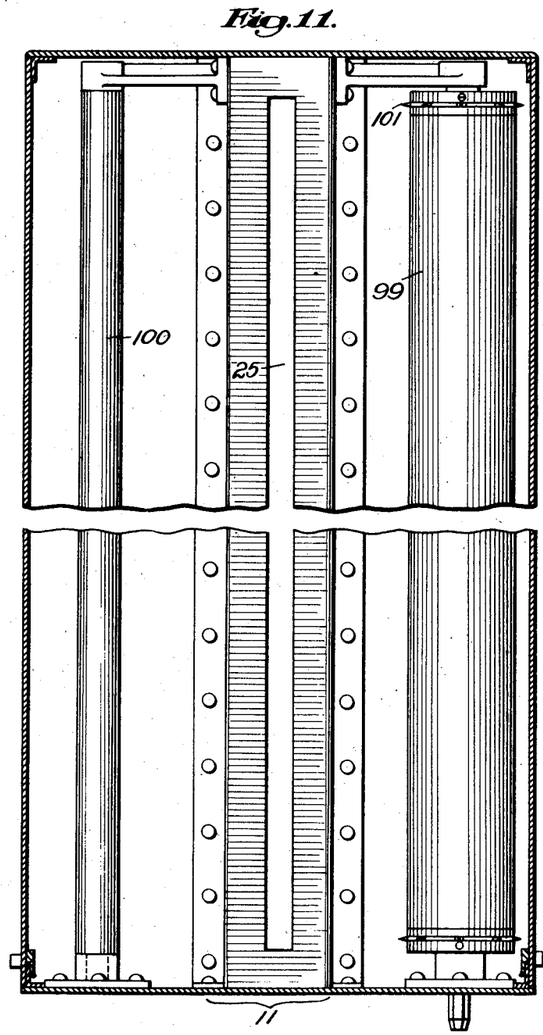
Fig. 11 is a view in vertical section with parts broken away, taken upon the vertical line 11—11 of Fig. 10.
Figure 12:
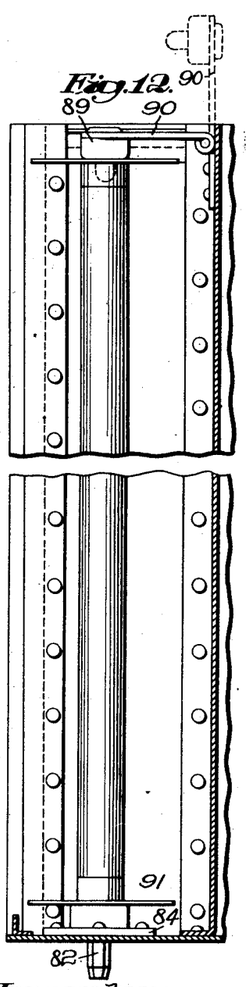
Fig. 12 is a vertical section with parts broken away, taken upon the line 12—12 of Fig. 10.
Figures 13, 14:
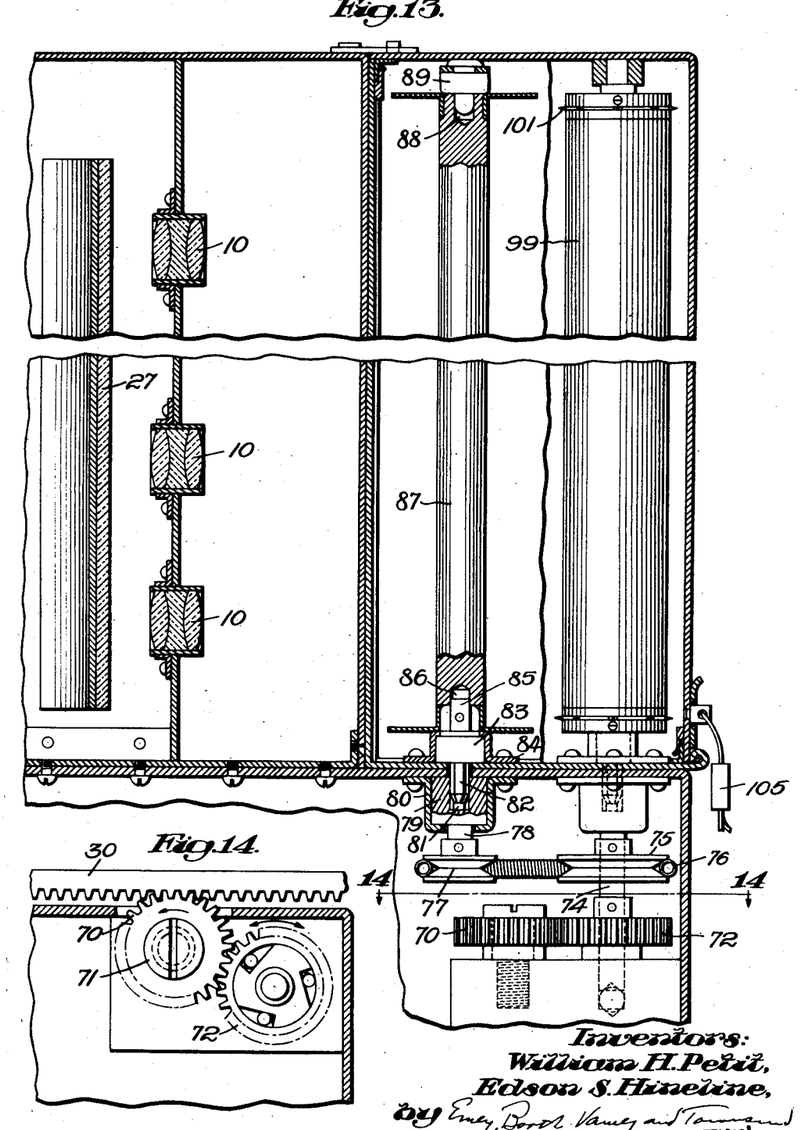
Fig. 13 is a vertical section, with parts broken away, upon the irregular line 13—13 of Fig. 7.
Fig. 14 is a transverse section upon the line 14—14 of Fig. 13 and looking downward in that figure.

As shown most clearly in Figs. 7, 8, 13 and 14, there is mounted inside the basal portion of the apparatus 5 a small pinion 70 which meshes with the rack 30 and is of the same diameter and number of teeth as the pinion 34 shown in Fig. 6. The said pinion 70 is mounted upon a stud 71 and meshes with a pinion 72 of equal diameter, which, as most clearly shown in Figs. 13 and 14, is provided with a forward ball clutch drive 73. As shown most clearly in Fig. 13, the shaft or spindle 74, whereon is the pinion 72, has fast thereon a small pulley 75 to receive a driving band or belt 76, preferably of coiled wire which will permit slippage if necessary. Said band 76 extends about another pulley 77, as shown in Fig. 13. The said pulley 77 is fast upon a stud shaft 78 having a head or enlargement 79 received or supported within a cap or enclosure 80 secured to the outside of the wall of the basal portion of the apparatus 5. Said head 79 is provided with an axial socket 81 polygonally shaped or splined to receive a similarly shaped axial extension 82 of a stud whose head is shown at 83. The head 83 is itself mounted within a cap or enclosure 84 secured to the inner side of the sealed magazine or receptacle 11. Said stud has upwardly extending from its head a pin 85 which is located to enter the socket 86 in the lower end of the take-up spool 87 which at its upper end, as shown most clearly in Figs. 10 and 13, is provided with a flange 87 and an axial socket 88 to receive a pin 89 supported by the pivoted bracket or member 90, shown in open position in dotted lines in Fig. 12. Said take-up spool is also provided with a flange 91 at its lower end.

Figure 7:
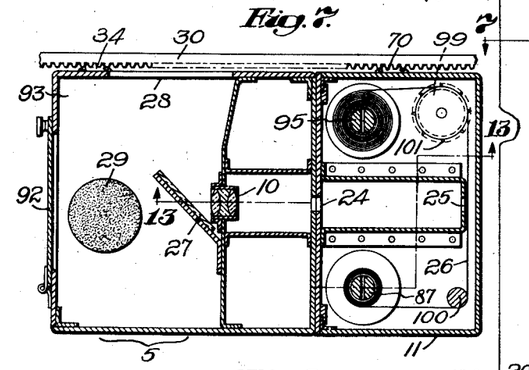
Fig. 7 is a view in transverse section upon the line 7—7 of Fig. 5.
Figure 8:
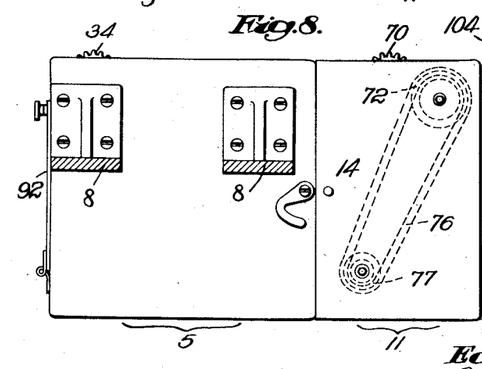
Fig. 8 is a bottom plan view thereof.

This or any other suitable construction may be provided to constitute the take-up spool or member onto which the film 26 is constantly wound during the travel of the photographic apparatus 5 as described, said film being best shown in Fig. 7.

Figure 4:
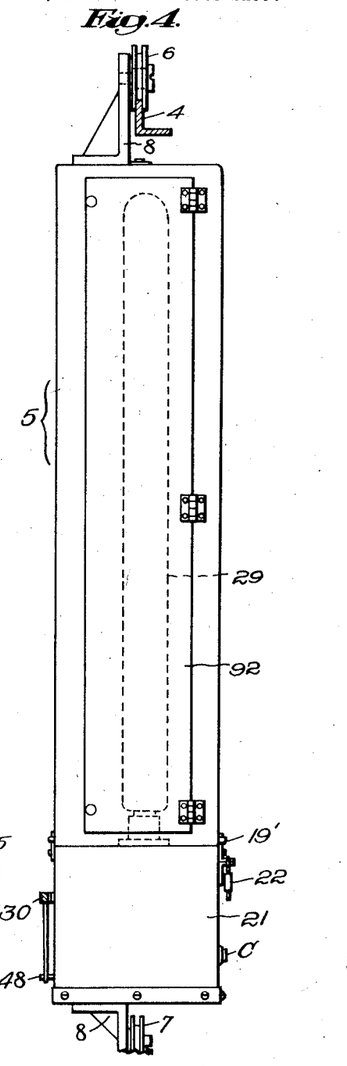
Fig. 4 is a side elevation of the structure shown in Fig. 3.

The upright portion of the photographic apparatus 5, and which contains the lamp 29, mirror 27 and the bank of lenses 10, is provided with a door 92, shown most clearly in Figs. 4 and 7, which is suitably equipped to prevent the admission of light into the chamber 93 of the said apparatus 5.

It will be understood that the sealed receptacle 11 may by the properly authorized person be removed from the basal portion of the apparatus 5, the driving connection shown in Fig. 13 being readily separable.

The film 26 is a sensitized film of any suitable character and provided as a sealed roll to be positioned as the let-off roll. As shown in section at 95 in Fig. 7, the said let-off roll is suitably supported at its ends, the supporting means at the upper end thereof being shown in Fig. 10 as a pivoted arm 96 having a stud 97 to engage a suitable axial socket in the spool of the roll. We provide a spring 98 to bear upon the film as it is drawn or let off during the travel of the camera.

The film is positioned in any suitable manner, as by unsealing the end of the film roll, then placing the roll in position indicated at 95 in Fig. 7, then drawing the leading end of the film about the measuring roll 99, then about the guide roll 100 and then securing the leading end of the film to the take-up roll 87 which, as described, is the driven roll of the film feeding mechanism.

The measuring roll 99 is provided with spurs 101 to engage suitable marginal openings in the film and thereby ensure the positive feeding of the film. Within the sealed magazine or receptacle 11 there may be provided a suitable wall 102 shown in Fig. 7 as of general U shape in transverse section, said wall having the opening 25 across which the film is fed at precisely the same rate of speed as the travel of the photographic aparatus 5 past the back of the voting machine.

Due to such fact of equalities of speeds a continuous exposure is made through the opening 28, the image being reflected by the mirror 27 through the entire bank of lenses 10 onto the film 26, which thus receives the impression of the entire back of the voting machine.

In this embodiment of the invention no shutter is employed since the lamp or electric light 29 is functioning only during the forward direction of travel of the voting apparatus (that is, toward the right in Fig. 1), and moreover, there is no feeding movement of the film during the return travel of the photographic apparatus 5 to the left viewing Fig. 1. The current passes through the lamp 29 when the motor is forwardly driven, but during the reverse driving of the motor the lamp 29 would be but very dimly functioning if at all, and if no shutter be employed there would at the most be merely a dark vertical line in the exposed film at the end of the first exposure.

Within the scope or purpose of the invention, we may provide a shutter which is automatically opened at the precise instant of the commencement of the travel of the voting machine from left to right, viewing Fig. 1, and which is held open until the travel toward the right is completed, when the shutter is automatically closed and remains closed until another exposure is desired.

It will be understood from the foregoing description of the construction and operation, that the film is at all times during the taking of the pictures sealed within the magazine or receptacle 11 (but is driven from the motor within the basal part of the apparatus 5). This is done through a third slide 104 indicated in Figs. 3 and 5 as at the front of the receptacle or magazine 11. The said slide or latch is sealed by a seal 105 which is to be broken only by an authorized person, for removing the film after both exposures have been made and the development thereof.

Figure 2:
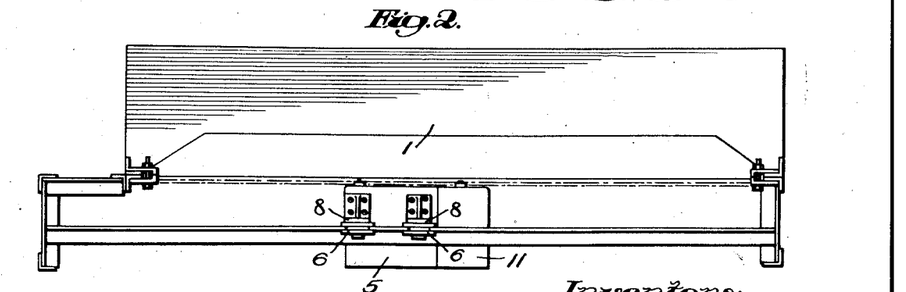
Fig. 2 is a plan view of the structure shown in Fig 1.

Although we have specifically described the application to a voting machine of our broad or generic invention, it is to be understood that this is one only of the uses to which our invention is adapted. So far as we are aware, we are the first to provide means including a battery of lenses whereby a sheet or surface of considerable size may be photographed at a very short range, as, for example, but a few inches, which is the case in the disclosed example or embodiment of the invention, as will be clear from an inspection of Figs. 1 and 2. Other broad features of the invention are set forth in the claims.

So far as we are aware, it has never heretofore been proposed to employ in and for a photographic camera and in combination therewith, a photographic film magazine having opposed sections adapted for assembly in closed, light-excluding relation and containing film supporting, feeding and take-up means mounted in a receptacle and adapted for operation by means carried by the camera, together with means for sealing said two sections of the film magazine together against tampering, whereby the said magazine may be used in the camera in its sealed condition, means being employed to seal the magazine in operative relation upon or to the camera whereby during the use of the camera the said receptacle is sealed thereto against removal.

Having thus described one illustrative embodiment of the apparatus of our invention, it is to be understood that although specific terms are employed, they are used in a generic and descriptive sense and not for purposes of limitation, the scope of the invention being set forth in the following claims:

We claim:

1. Mechanism for photographing a relatively large object-surface close to the sensitive surface of the photographic apparatus, comprising in combination, a photographic apparatus including a first receptacle having a series or bank of lenses positioned so that each lens functions with respect to a single transverse zone of the surface to be photographed, said lenses collectively functioning with respect to the entire object-surface by blending their zones, a second receptacle closed against tampering and adapted to be applied to said first receptacle and together therewith to constitute a photographic apparatus in light communication, said second receptacle having therein means to support a sensitized film for feeding, and said first receptacle having means to feed the film.

2. Mechanism for photographing a relatively large object-surface close to the sensitive surface of the photographic apparatus, comprising in combination, a photographic apparatus including a first receptacle having a series or bank of lenses positioned so that each lens functions with respect to a single transverse zone of the surface to be photographed, said lenses collectively functioning with respect to the entire object-surface by blending their zones, a second receptacle closed against tampering and adapted to be applied to said first receptacle and together therewith to constitute a photographic apparatus in light-communication, said second receptacle having therein means to support a sensitized film for feeding, and said first receptacle having means to feed the film and adapted to be operatively engaged with the supporting means for the film in the said second receptacle.

3. Mechanism for photographing a relatively large object-surface close to the sensitive surface of the photographic apparatus, comprising in combination, a photographic apparatus havng a series or bank of lenses positioned so that each lens functions with respect to a single transverse zone of the surface to be photographed, said lenses collectively functioning with respect to the entire object-surface by blending their zones, said photographic apparatus including a first receptacle having therein said bank or series of lenses and also includng a second receptacle closed against tampering and adapted to be applied to said first receptacle so as together to constitute a photographic apparatus in light communication, said second receptacle having therein means to support a sensitized film.

4. Mechanism for photographing a relatively large object-surface close to the sensitive surface of the photographic apparatus, comprising in combination, a photographic apparatus having a series or bank of lenses positioned so that each lens functions with respect to a single transverse zone of the surface to be photographed, said lenses collectively functioning with respect to the entire object-surface by blending their zones, a first receptacle receiving said bank or series of lenses and also having a source of light and an exposure opening, a second receptacle adapted to be applied to said first receptacle and together therewith constituting the photographic apparatus, said second receptacle having therein means to support a sensitized film, said first receptacle having means to feed said film and adapted to engage the support for the film in the second receptacle.

5. For use in a photographic camera and in combination, a photographic film magazine having opposed sections adapted for assembly in closed, light-excluding relation, and containing film supporting, feeding and take-up means mounted in the receptacle and adapted for operation by means carried by the camera, means for sealing said two sections together against tampering, whereby the magazine must be used in the camera in its sealed condition, and means for sealing said magazine in operative relation upon the camera, whereby during the use of the camera, the receptacle is sealed thereto against removal.

6. For use in a photographic camera and in combination, a photographic film magazine having opposed sections adapted for assembly in closed, light-excluding relation, a latch on one section and means on the other section to engage said magazine, said magazine containing film supporting, feeding and take-up means mounted in the receptacle and adapted for operation by means carried by the camera, means engaging said latch for sealing said two sections together against tampering, whereby the magazine must be used in the camera in its sealed condition, and means for sealing said magazine in operative relation upon the camera, whereby during the use of the camera, the receptacle is sealed thereto against removal.

WILLIAM H. PETIT.
EDSON S. HINELINE.